(12) United States Patent
Tucker et al.

(10) Patent No.: US 6,588,468 B1
(45) Date of Patent: Jul. 8, 2003

(54) ROUTER TABLE JOINT MAKING MACHINE

(75) Inventors: Edwin C. Tucker, Ottawa (CA); Brent K. Hyde, Ottawa (CA)

(73) Assignee: Lee Valley Tools Ltd. (CA)

( * ) Notice: Subject to any disclaimer, the term of this patent is extended or adjusted under 35 U.S.C. 154(b) by 0 days.

(21) Appl. No.: 09/990,202

(22) Filed: Nov. 21, 2001

Related U.S. Application Data

(63) Continuation-in-part of application No. 09/595,742, filed on Jun. 16, 2000, now abandoned.
(60) Provisional application No. 60/140,254, filed on Jun. 18, 1999.

(51) Int. Cl.⁷ ............................................. B27M 1/00
(52) U.S. Cl. .......................... 144/372; 144/85; 144/87; 144/135.2; 144/145.1; 144/144.51; 144/253.1; 144/253.2; 144/204.2; 144/371
(58) Field of Search ............................ 144/82, 85, 87, 144/136.1, 137, 144.51, 145.2, 371, 372, 253.1, 253.2, 253.5, 204.2

(56) References Cited

U.S. PATENT DOCUMENTS

| | | |
|---|---|---|
| 368,761 A | 8/1887 | Ferguson |
| 451,165 A | 4/1891 | Zimmerman |
| 601,194 A | 3/1898 | Zimmerman |
| 778,521 A | 12/1904 | Wheat |
| 965,013 A | 7/1910 | Reitz |
| 1,174,835 A | 3/1916 | Durkee et al. |
| 1,235,476 A | 7/1917 | Hoff |
| 1,494,016 A | 5/1924 | Prescott |
| 1,602,336 A | 10/1926 | Carter |
| 2,291,177 A | 7/1942 | Vanderveld |
| 2,766,561 A | 10/1956 | Carlson |
| 2,834,937 A | 6/1958 | Cornelius |
| 2,916,063 A | 12/1959 | Boekenkamp |
| 2,972,366 A | 2/1961 | Caruso |
| 3,325,948 A | 6/1967 | Gronke |
| 3,591,989 A | 7/1971 | Granlie |
| 3,604,484 A | 9/1971 | Viljoen |
| 3,866,539 A | 2/1975 | Gasser |
| 4,163,465 A | 8/1979 | Strong |
| 4,428,408 A | 1/1984 | Grisley |
| 4,445,553 A | 5/1984 | Hanyzewski et al. |
| 4,462,440 A | 7/1984 | Dolfi |
| 4,509,572 A | 4/1985 | L'Archer |
| 4,593,735 A | 6/1986 | Wirth, Jr. |
| 4,655,445 A | 4/1987 | Morse |
| 4,693,288 A | 9/1987 | Buechele et al. |
| 4,742,856 A | 5/1988 | Hehr et al. |
| 4,749,013 A | 6/1988 | Ducate, Sr. |
| 4,763,706 A | 8/1988 | Rice et al. |
| 4,787,127 A | 11/1988 | Beall |
| 4,793,604 A | 12/1988 | Taylor |
| 4,809,755 A | 3/1989 | Pontikas |
| 4,884,604 A | 12/1989 | Rice et al. |
| 4,909,292 A | 3/1990 | Wirth, Jr. |
| 4,930,221 A | 6/1990 | Taylor |
| 4,934,422 A | 6/1990 | Hempy et al. |
| 4,940,067 A | 7/1990 | Beard |
| 4,991,637 A | 2/1991 | Butler |
| 5,009,255 A | 4/1991 | Fournel |
| 5,025,841 A | 6/1991 | Totten |
| 5,056,375 A | 10/1991 | Kapton et al. |
| 5,101,875 A | 4/1992 | Eckhold et al. |
| 5,114,265 A | 5/1992 | Grisley |
| 5,123,463 A | 6/1992 | Grisley |
| 5,139,062 A | 8/1992 | Keller |

(List continued on next page.)

*Primary Examiner*—W. Donald Bray
(74) *Attorney, Agent, or Firm*—Kilpatrick Stockton LLP; John S. Pratt; Kristin L. Johnson

(57) ABSTRACT

A machine for use with a table-mounted router to form a wide variety of woodworking joints by manipulating a workpiece to engage the router cutter in predetermined locations, in some instances by reference to a joint element template, and in other instances by reference to predetermined lateral locations, to form joint elements with predetermined shapes and spacing.

14 Claims, 16 Drawing Sheets

U.S. PATENT DOCUMENTS

| | | |
|---|---|---|
| 5,146,807 A | 9/1992 | Wixey et al. |
| 5,156,508 A | 10/1992 | Grisley |
| 5,186,226 A | 2/1993 | Wang |
| 5,195,730 A | 3/1993 | Taylor |
| 5,275,074 A | 1/1994 | Taylor et al. |
| 5,289,861 A | 3/1994 | Hedrick |
| 5,337,641 A | 8/1994 | Duginske |
| 5,396,937 A | 3/1995 | Clausen |
| 5,421,384 A | 6/1995 | Nuwordu |
| 5,423,360 A | 6/1995 | Taylor et al. |
| 5,492,160 A | 2/1996 | McCracken |
| 5,494,089 A | 2/1996 | Lubbe |
| 5,584,328 A | 12/1996 | Grisley |
| 5,586,591 A | 12/1996 | Gaydos |
| 5,590,989 A | 1/1997 | Mulvihill |
| 5,598,878 A | 2/1997 | Wirth, Jr. et al. |
| 5,653,273 A | 8/1997 | Bach |
| 5,711,356 A | 1/1998 | Grisley |
| 5,716,045 A | 2/1998 | Taylor |
| 5,823,239 A | 10/1998 | Smith |
| 5,832,977 A | 11/1998 | Hampton |
| 5,890,524 A | 4/1999 | Tucker et al. |
| 5,918,652 A | 7/1999 | Tucker |
| 5,931,208 A | 8/1999 | Gifkins |
| 5,993,123 A | 11/1999 | Allred, III et al. |
| 6,041,837 A | 3/2000 | Hanson |

ROUTER TABLE JOINT MAKING MACHINE

CROSS REFERENCE TO RELATED APPLICATIONS

This application is a continuation-in-part of U.S. application Ser. No. 09/595,742, filed Jun. 16, 2000, and now abandoned which claimed priority to U.S. provisional application Ser. No. 60/140,254, filed Jun. 18, 1999, each of which applications are incorporated herein by this reference.

FIELD OF THE INVENTION

This invention relates to methods and apparatus for forming woodworking joints, especially dovetail and similar joints, and it relates more particularly to devices and techniques for enabling such joints to be cut utilizing a router.

BACKGROUND

Wooden boxes, drawers and storage chests and a variety of other wooden furniture and other objects often use dovetail joints as a means of securely assembling the sides. Dovetails are used for both their decorative nature and their high strength. Such joints can be made without industrial machinery in one of two principal ways, either using hands tools: saws and chisels, or using power tools such as a router. In both cases, making such a joint requires a high degree of skill and precision, and in the case of hand tools, time. The desire to save time drives most woodworkers towards the use of power tools, and the need for precision, often in the relative absence of skill, makes jigs or machines that control the power tools desirable.

There are two basic approaches possible when using a router. The router can be held stationary and the workpiece moved relative to the position of the router cutter, or the workpiece can be held stationary and the router moved relative to the workpiece. Additionally, in a variation of both basic approached, both the router and the workpiece can be moved.

SUMMARY OF THE INVENTION

This invention is a machine that facilitates cutting of dovetail and other joints such as box joints using an approach in which the position of the rotating router cutter is maintained stationary and the workpiece is moved relative to the cutter. The machine is typically used with a router mounted upside down in a router table so that the router bit or cutter protrudes through a hole in the tabletop. Such a table is disclosed, for instance in U.S. Pat. No. 5,715,880, but this invention is usable with a wide variety of other router tables.

The machine of this invention utilizes an elongated track called a guide that is clamped or otherwise fastened to the router tabletop. Typically, this guide will be positioned so that a router bit or cutter mounted in a router attached to the router table protrudes through the hole in the guide, making it a "center guide." A lower fence assembly positions a lower fence transverse to the center guide with base wings attached to the lower fence and contacting either side of the center guide so that the lower fence can slide along the center guide and across the router cutter, which passes through an opening in the lower fence. The opening may be filled with sacrificial material such as wood or ultra high molecular weight ("UHMW") polyethylene. An upper fence that controls the lateral position of a workpiece slides along on the top of the lower fence and can be locked (using a control block and locks associated with it) in position relative to the lower fence.

The position of the upper fence relative to the lower fence can be fixed by reference to predetermined stops positioned by the user in a spacer tray (or, alternatively, the user may make a spacer stick) that is locked in the upper fence. The locations of the stops determines the spacing of joint components and controls movement of the machine components so that joint components are formed in the desired locations on workpieces. In some aspects of operation, such as when pins in through dovetail or finger joints are formed, the upper fence is permitted to slide relative to the lower fence during use of the machine.

Except when making half-blind dovetail tails, the machine functions by clamping a workpiece against one face of the upper fence so that the workpiece stands upright with its end resting against machine wings that in turn rest just above the table top. The lateral position of the upper fence (and therefore the position of the workpiece clamped to it) is determined by interaction among a control block, the upper fence and the lower fence.

The control block can slide along the upper fence or can be locked to prevent such sliding motion. Alternative positions at which the control block is locked to the upper fence are determined by engagement between an indexing pin attached to the control block and holes in spacers positioned in the spacer tray (or holes in a user-made spacer stick), which tray (or stick) is locked into the upper fence during use of the machine. The control block can also be locked to the lower fence so that the relative positions of the upper and lower fences may be secured in a manner limiting or eliminating play between the two fences.

"Tails," such as the tails in a dovetail joint, are cut by locking the control block to both the upper fence and the lower fence, which locates the upper fence in selected predetermined positions relative to the lower fence and prevents sliding movement between the two fences, thereby fixing the lateral position of the workpiece relative to the router cutter. The workpiece clamped to the upper fence is then passed around a router cutter having an appropriate shape, such as a dovetail-shaped cutter, by sliding the workpiece and upper and lower fence assembly along the center guide. The cutter exits the workpiece in a space in the lower fence that may be filled with a replaceable block of ultra high molecular weight polyethylene or other sacrificial material. The upper fence is then repositioned to the next predetermined position by unlocking the two fences and moving the upper fence so that the indexing pin can be received in another hole in the spacers in the spacer tray (or in the spacer stick), and a second cut is made. Multiple tail boards or workpieces can be cut simultaneously, limited only by the size of the machine and its capacity to hold workpieces.

"Pins," such as pins in a dovetail joint, are cut by mounting on the underside of the control block a template having the shape and, typically, nominal size of each pin to be cut. The control block is locked to the upper fence, but that fence is permitted to move relative to the lower fence, allowing the workpiece to move in two directions: (1) laterally relative to the cutter, and (2) forward along the center guide and into the cutter as described above. The workpiece clamped to the upper fence is then forced into the router cutter while the template is rubbed against a tracer pin located in a tracer pin jack secured to the center guide, for instance, by screwing a threaded pin jack base into a threaded hole in the center guide. Contact between the tracer pin and template allows material to be cut away from the workpiece except where the workpiece pin is desired. After formation of a pin in one desired location on the workpiece by removing the adjacent waste, the control block is repositioned on the upper fence by moving the indexing pin to another hole in the spacer tray, and the operation is repeated to form another pin at another desired location. Since lateral positioning of the upper fence is controlled in each instance by the spacer in the same spacer tray (or hole in a spacer stick), joint pins and tails are formed in the same locations.

The tracer pins have a conical shape and are used in multiple sizes to make possible a wide range of joint component sizes. The height of each tracer pin relative to the router tabletop and the template is adjustable using the pin jack. This makes possible adjustments in the size of joint pins produced using a particular template, because changes in tracer pin height change the effective diameter of the tracer pin in contact with the template.

Joint tails in half-blind dovetail joints are cut with the tail-containing workpiece face down on the wings that lie just above the router table top. The lower fence is fixed in place on the router tabletop, or a stop is utilized to fix lower fence travel along the center guide, to thereby limit the distance the dovetail cutter enters the workpiece as the workpiece travels against the cutter. An auxiliary fence is secured to the upper fence projecting at a right angle from the upper fence (parallel to the center guide). With the upper fence positioned relative to the lower fence with the indexing pin in one of the spacer holes as described above, the workpiece is slid along the auxiliary fence and into the dovetail cutter and then back out. Alternatively, if the lower fence is permitted to move until it reaches a stop, the workpiece is positioned against the auxiliary and lower fences, and the workpiece and fences are slid so that the cutter enters the workpiece until the stop is reached. The upper fence is then relocated by moving the indexing pin to another spacer hole, and the workpiece is again slid along the auxiliary fence and into the dovetail cutter, or the workpiece and fences are slid as described above, to make a second and subsequent cuts.

The track or guide and fence components can be made of extruded aluminum, and most of the other components can be made of a variety of metals, including steel, brass, and aluminum as well as other materials, including plastics and other materials.

The machine and techniques of this invention facilitate cutting the most common joints, through dovetail, half-blind dovetail and finger joints. The machine can also cut rounded finger joints, double-sided rounded finger joints, double sided dovetails and rounded dovetails. FIG. 21 illustrates some of these joints. With appropriately shaped cutters and templates other joint shapes are also possible. Because it is necessary to have only one template for a particular joint shape, it is practical for the user of the joint-making machine of this invention to make templates and create joints in any desired shape within the broad range of shapes possible. It also makes it economical for a user to purchase alternative templates because only one is need for any desired new shape (within certain size limits for that shape).

This invention therefore provides a versatile joint making machine for use with a router to make woodworking joints. This invention is accurate, easy to use, and easy to set up for making a wide range and variety of different joints with user selected spacings of joint elements. Other advantages and benefits of this invention will be apparent to those skilled in the art from the drawings and the following description of the invention and claims. For instance, the capabilities of this invention can be used not only for creating joints but for creating repeating patterns in items such as moldings, an operation that may be facilitated by use of an apparatus controlling vertical positioning of the router bit so that it can be lifted through the router table into the workpiece when desired. Such a device for controlling the vertical position of the router bit is disclosed in U.S. Pat. No. 5,918,652, which is incorporated herein by reference.

DETAILED DESCRIPTION

Figure 1:
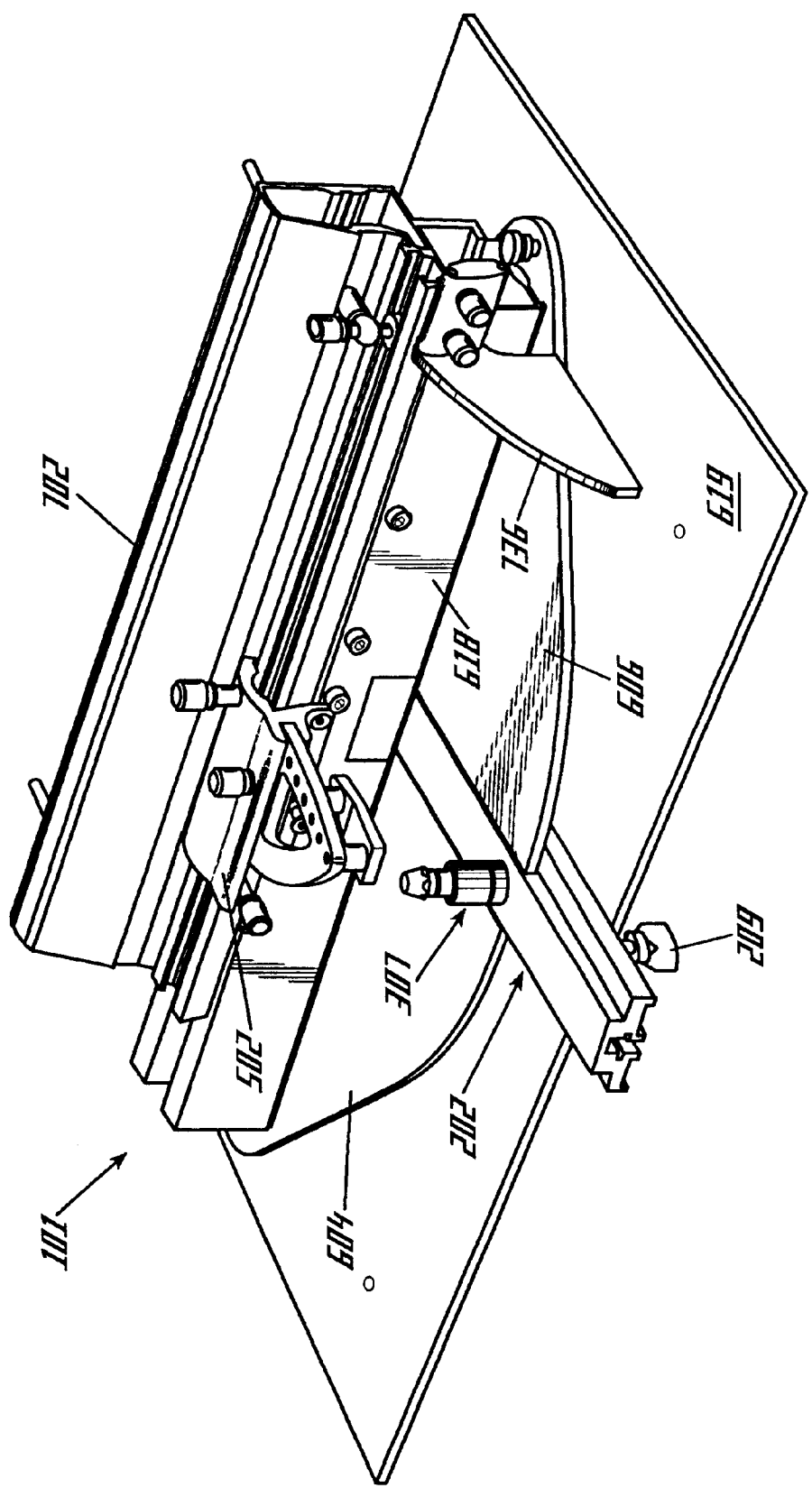
FIG. 1 is a perspective view of the joint making machine of this invention shown mounted on a router table top.
Figure 2:
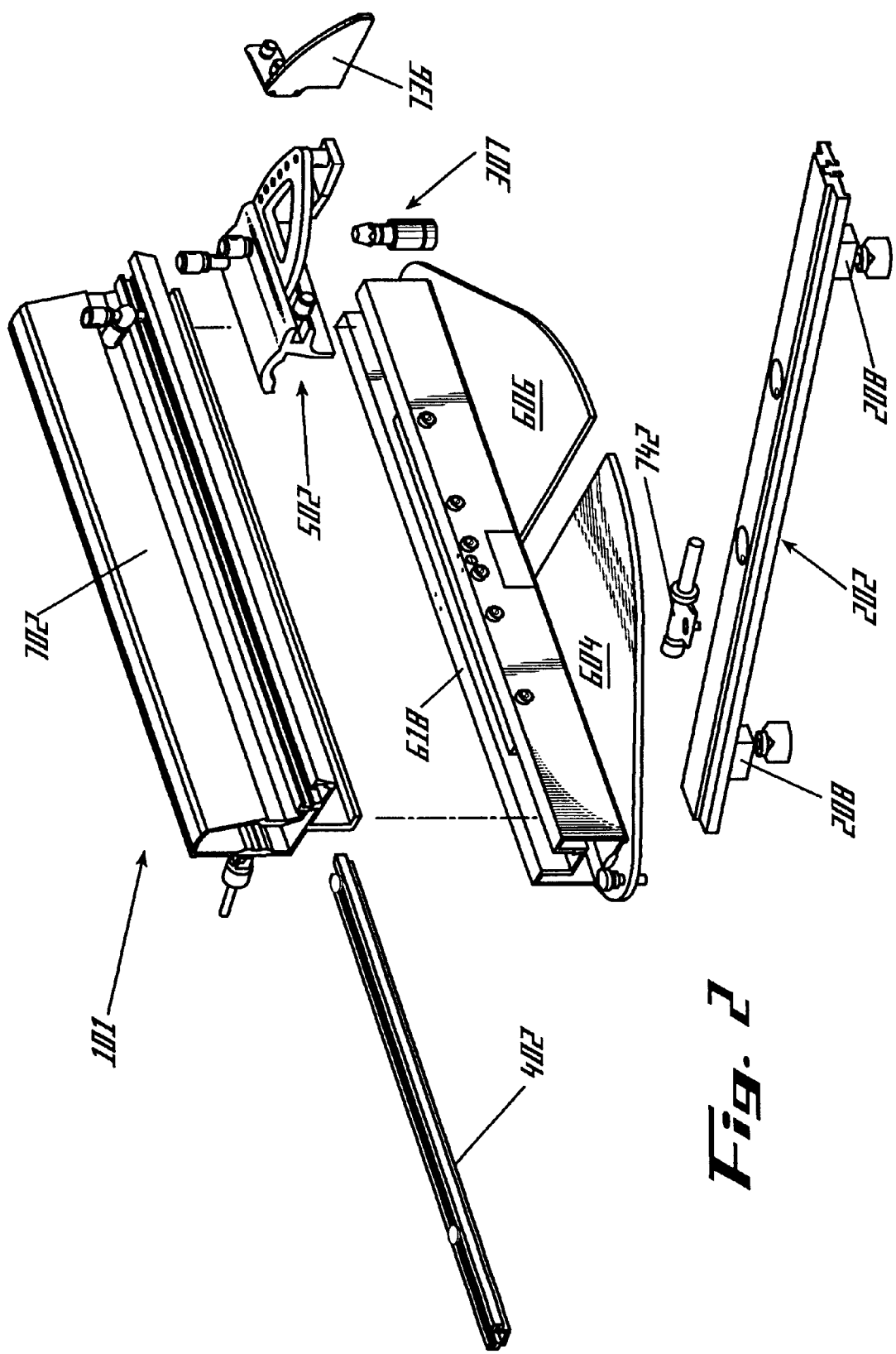
FIG. 2 is an exploded perspective view of the principal components of the joint making machine of this invention.

FIG. 1 illustrates an exemplary joint making machine 101 of this invention mounted on a router table top 619, and FIG.

2 illustrates the machine 101 in an exploded perspective view. For simplicity, threads are not shown in the drawings on all of the components in the exemplary embodiment that are threaded.

Operating Principles

Figure 3:
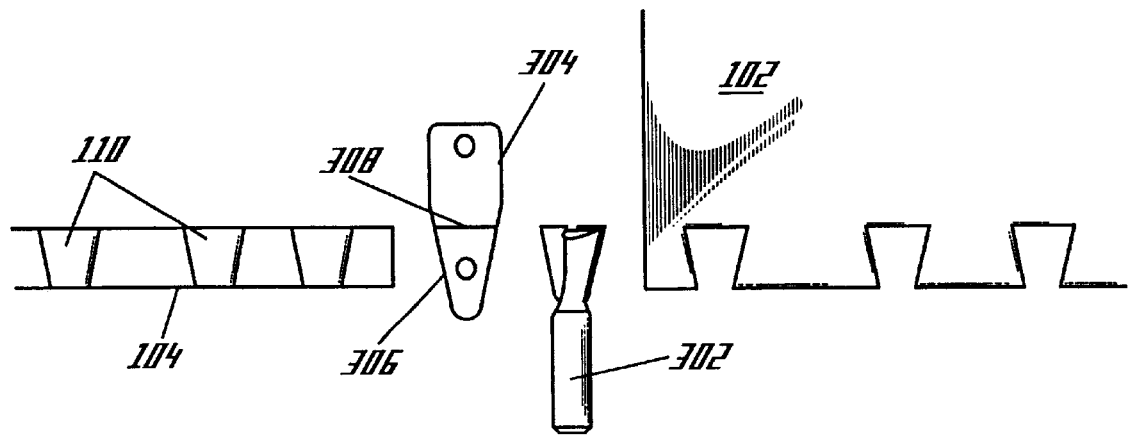
FIG. 3 shows the relationship among a dovetail tailboard, pin board, cutter, and template of this invention.
Figure 21:
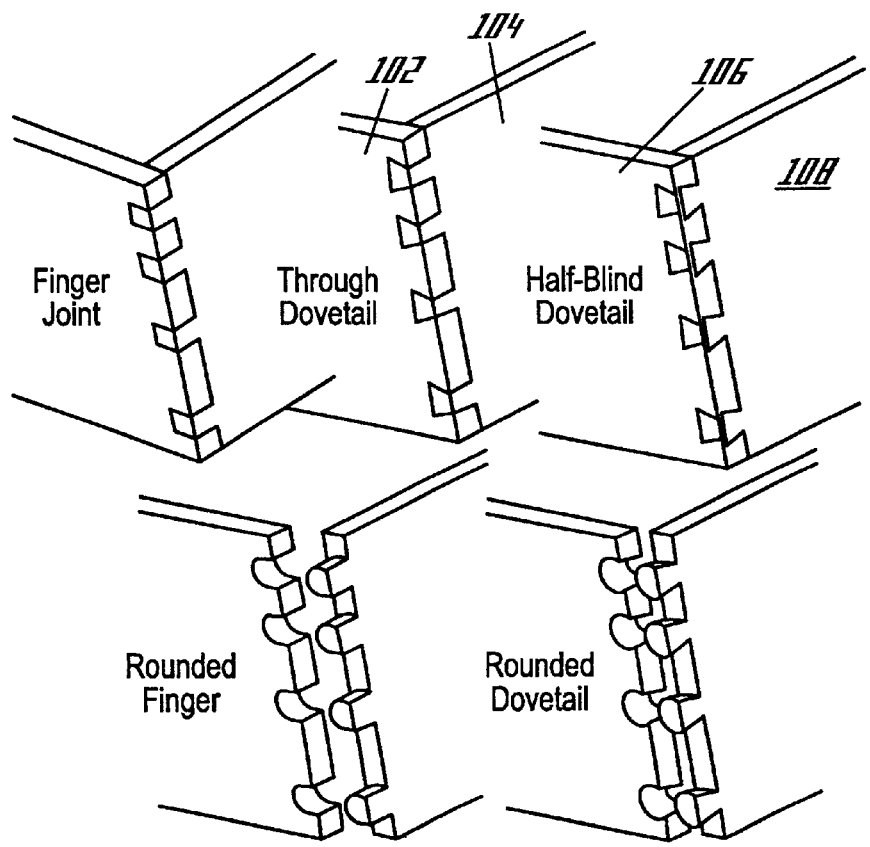
FIG. 21 depicts exemplary joints made with the joint making machine of this invention.

For joints including a pair of panel shaped workpieces, each workpiece end can be classified as either a tailboard or a pin board. Tailboards, such as tailboard 102 in FIGS. 21 and 3, result from passing a cutter through (or at least into) the board in a straight line leaving a void having the profile of the cutter. Pin boards, such as pinboard 104 in FIGS. 21 and 3 are the result of removing material from a workpiece except where a template prevents material removal. Template shape determines the end or cross sectional shape of the pin board pins. Template shape is directly related to the shape of the cutter used producing the tailboards. This principle is illustrated in FIG. 3, which shows use of a ⅞" 14° dovetail cutter 302 with a dovetail-shaped template 304 with 14° sides 306 and a nominal width 308 of ⅞". The template (such as template 304) determines the shape of the dovetail pins, and the dovetail cutter determines the shape of the tails.

Figure 4:
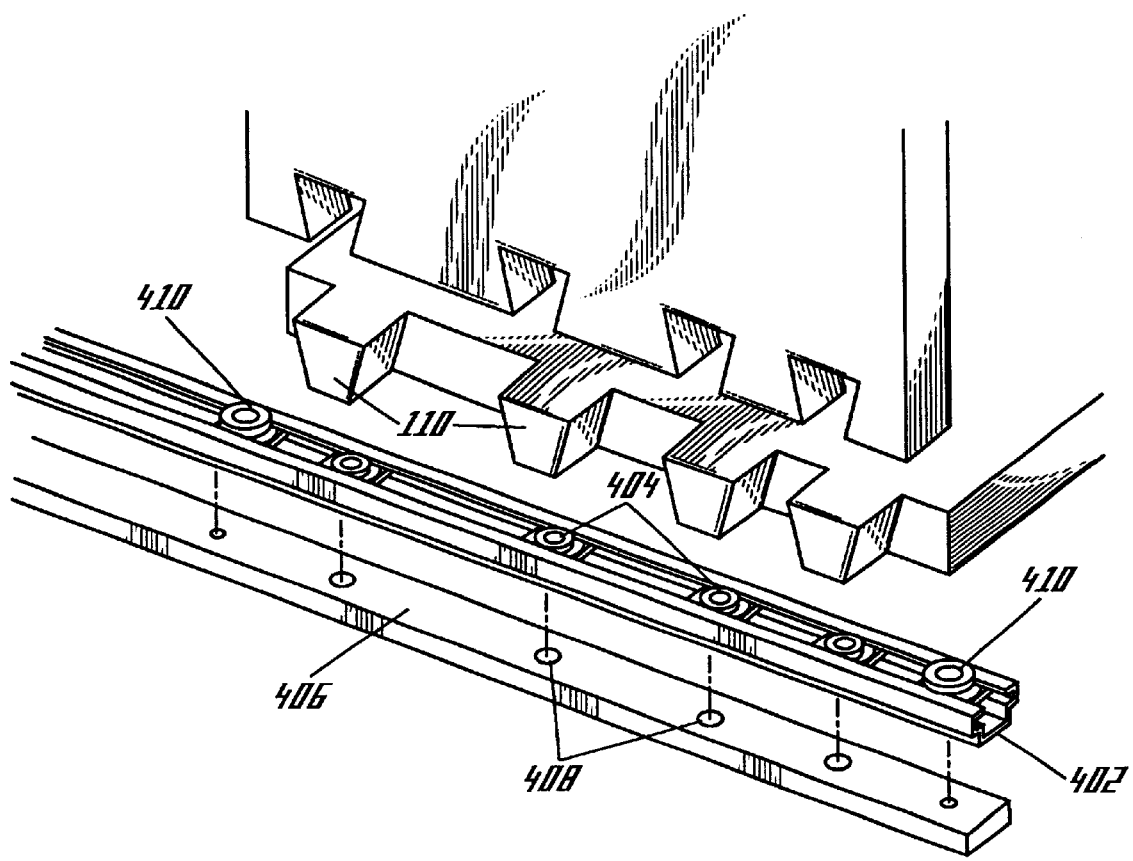
FIG. 4 depicts a user made spacer and the spacer tray of this invention and joint components made with the illustrated spacers.

Spacers are used to determine where the centers of both the pins and tails will be located. They can be spaced at regular intervals or at variable intervals. As is illustrated in FIG. 4, a spacer tray 402 with movable spacers 404 or a user-made spacing stick 406 may be used to control the spacing. Because of the use of spacers to determine the locations of each pair of complimentary joint components, only one template is needed for formation of multiple pins, such as pins 110, in each joint. This simplifies template-making as compared to many conventional joint-making machines in which the template has to have a separate element corresponding to each joint element.

Figure 5:
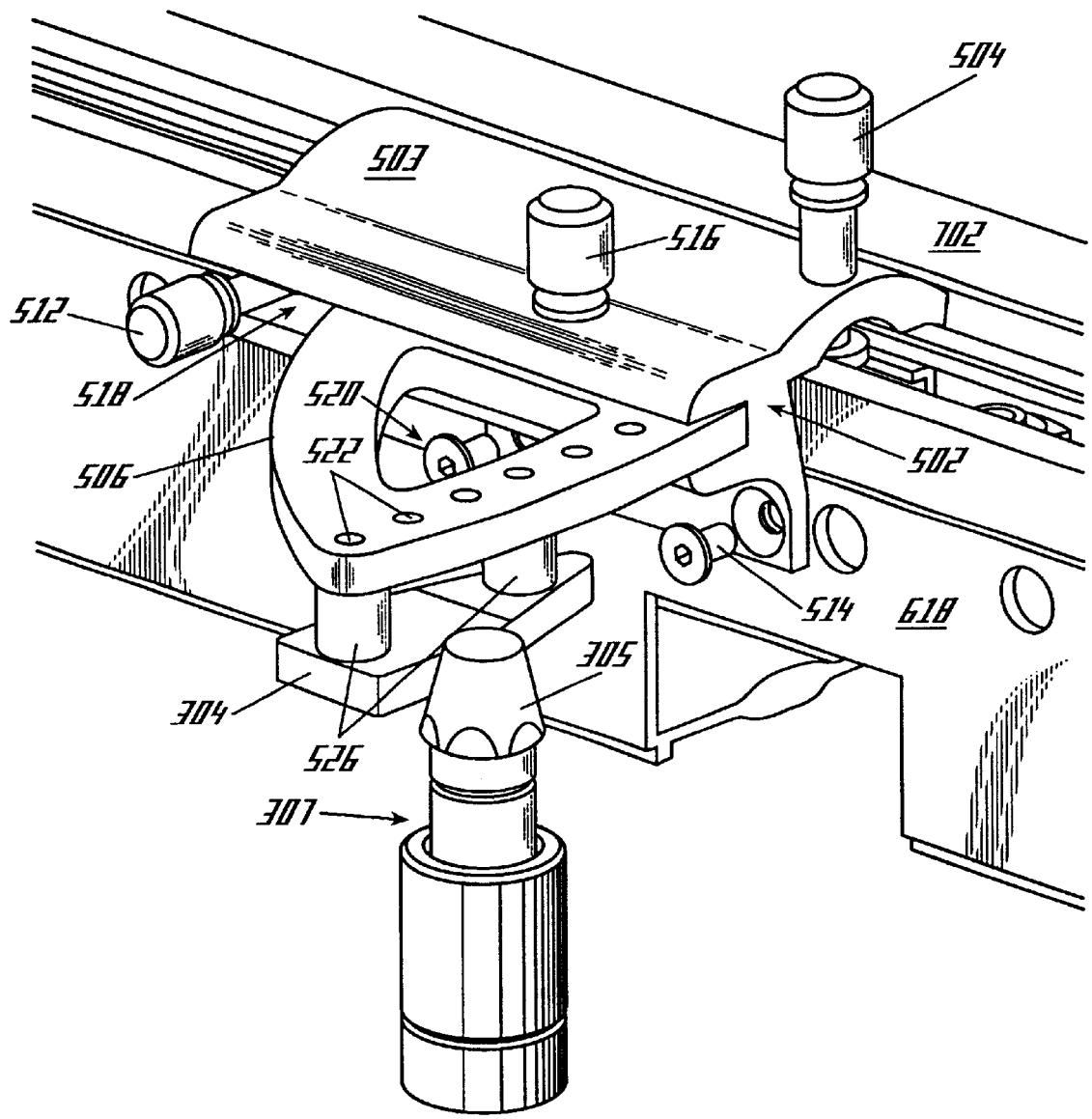
FIG. 5 is a perspective of the controller and pin jack of this invention, together with portions of the upper and lower fences, and with lower fence locking screws shown exploded away from the control block.

The controller 502 illustrated in FIG. 5 is the part of this invention that controls what type of cut is made. The controller 502 comprises three main components, the indexing pin or screw 504, which rides in the controller body 503, the template arm 506 and the tracer pin jack assembly 307.

The indexing screw or pin 504 engages the spacers 404 in the spacer tray 402 or the holes 408 in a user made spacing stick 406. The location of the indexing screw 504 determines where the center of each pin and tail is located in the workpieces.

The template arm 506 is used to hold the template 304 that is used when cutting joint pins. The shape of the template is driven directly by the shape of the cutter used to cut the tailboards. Among other shapes, templates may be shaped for through dovetail, half-blind dovetails and finger joints. Experienced users may make their own templates.

The pin jack 307 is used in conjunction with the templates to create the pin boards. The tracer pin 305 traces around the template (or, more accurately, the template 304 traces around the pin 305) forcing the cutter to follow an identical path and remove waste, thereby forming the pins 110 on the pin board. One template is used for all the pins 110 in a particular joint.

The Lower Fence Assembly

Figure 6:
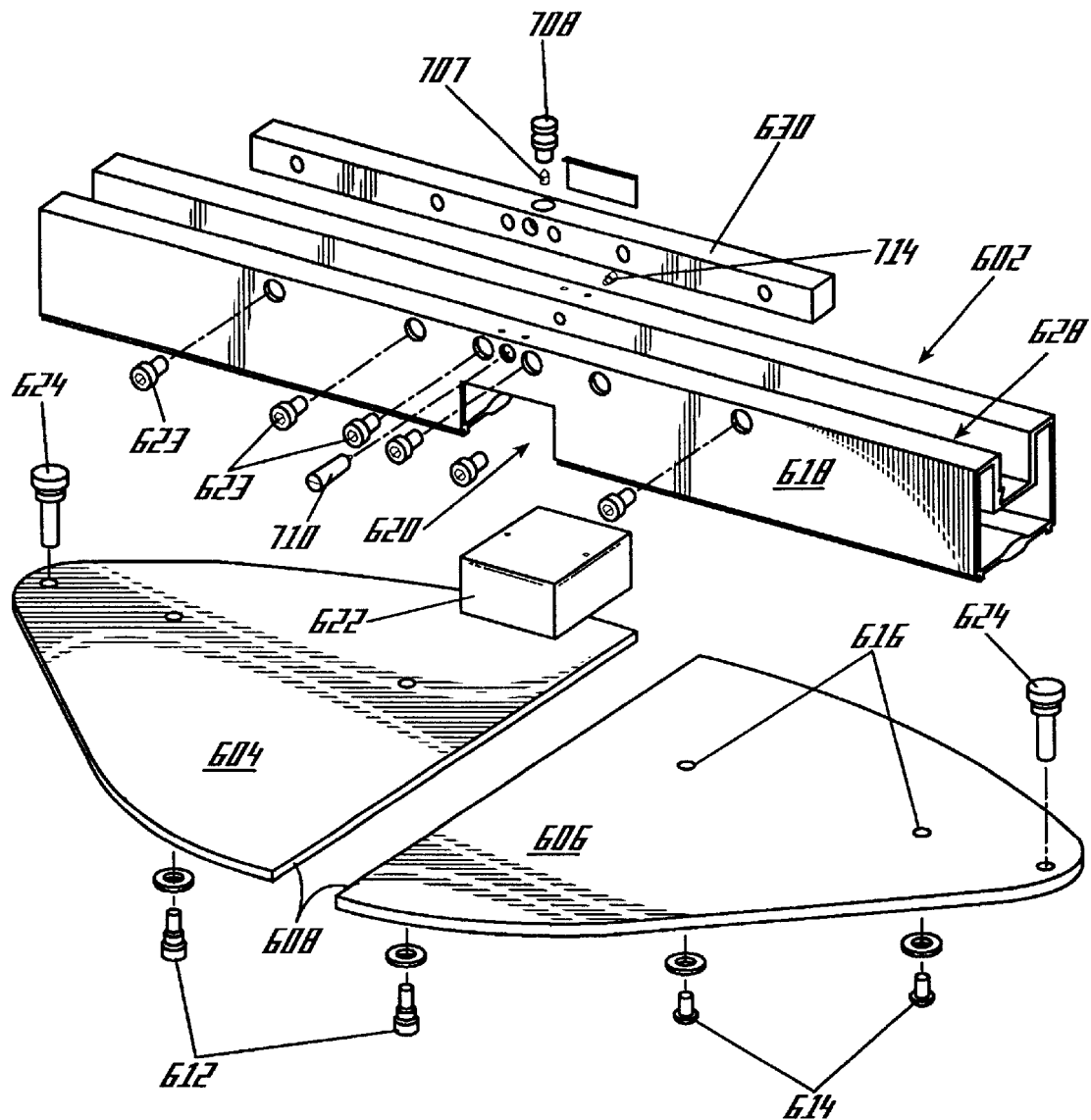
FIG. 6 is an exploded perspective view of the lower fence assembly shown in FIGS. 1 and 2.

The lower fence assembly 602, shown exploded in FIG. 6, provides the connection between the front-to-back motion and the left-to-right motions required to control the compound cuts that form the shaped pins.

Figure 19:
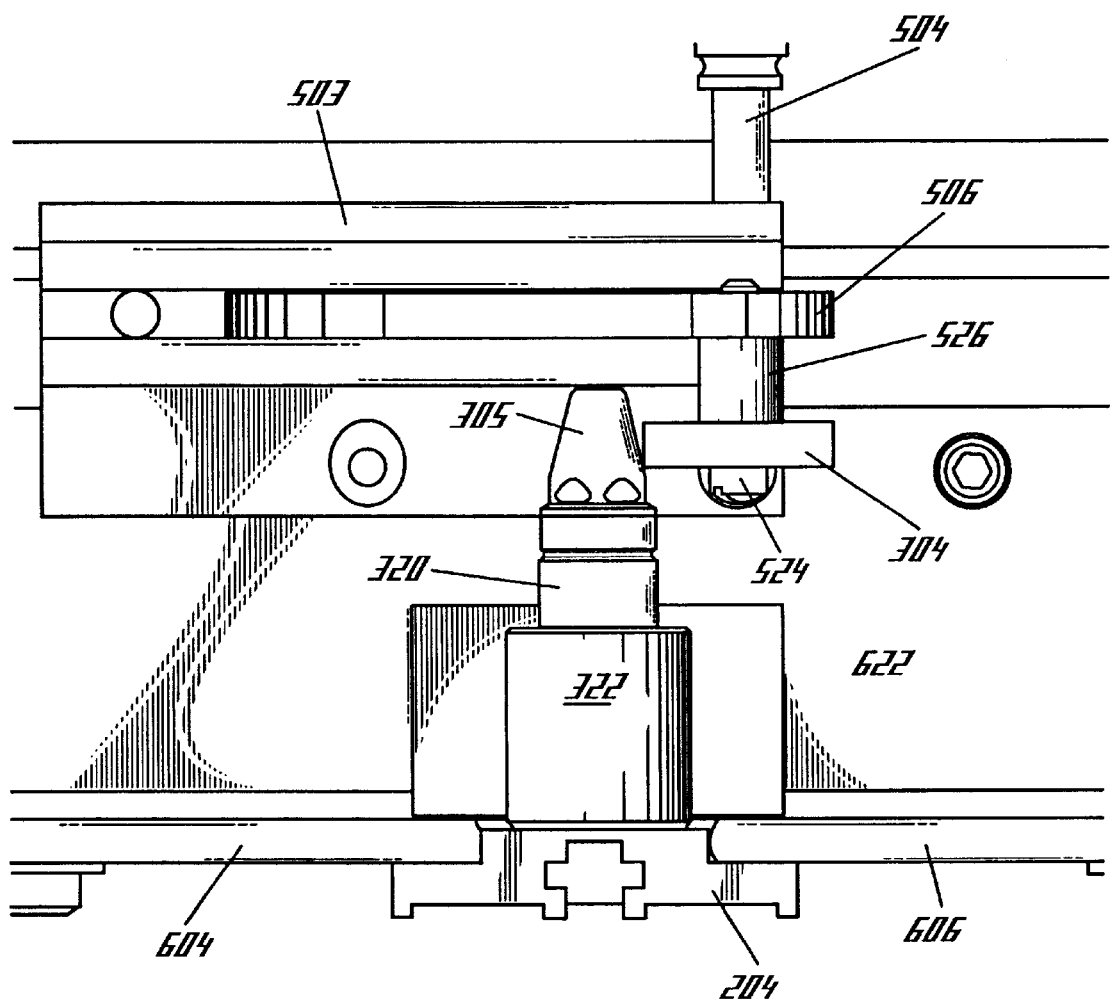
FIG. 19 is a front elevation view showing the relationship between a tapered pin and a template during use of this invention to form a pin in a workpiece.

Fence assembly 602 has two wings 604 and 606 that slide back and forth along the center guide assembly 202 (described below). Wings 604, 606 do not directly contact the router table top but rather rest on the center guide rail 204 (as may be seen in FIG. 19) and the tips of nylon thumb screws 624 that are positioned in threaded holes in the wings 604 and 606 or are otherwise secured to protrude from the bottom of the wings, such as, for instance, by positioning nuts above and below the wing 604 or 606. The upper part 203 of the center guide assembly 202 fits in the gap between the wings 604 and 606. The edge 608 of each wing that slides along the center guide may be rounded over to minimize the contact area. The width of the gap 610 between edges 608 of wings 604 and 606 is controlled using the two mounting screws 612 for each wing 604 and 606. The position of the left wing 604 is fixed by shoulder screws 612. The right wing 606 is allowed to move slightly by using oversize holes 616 in wing 606 through which cap screws 614 are positioned. This permits adjustment of the distance and parallelism between the two wings 604 and 606. Typically the play between the wings and the center rail should be about 0.003". This can be set using a sheet of paper between the components when tightening screws 614 in holes 616.

The lower fence 618 has a cutout 620 into which an UHMW polyethylene block 622 or other sacrificial material such as wood is inserted. Two screws (not shown) may be inserted from the top of the guide to secure the block 622. The purpose of block 622 is to provide a backing for the workpiece to prevent tear out from the router cutter. Additionally, if the UHMW block 622 is positioned proud of the lower fence 618 and flush with the upper fence 702 face 730, friction between the workpiece and the lower fence 618 will be minimized at the same time that tear-out is reduced.

Each wing 604 and 606 has a nylon thumbscrew 624 at the ends of the fence 618. The ends of screws 624 contact router table top 619 and prevent rocking on center guide 202.

Figure 7:
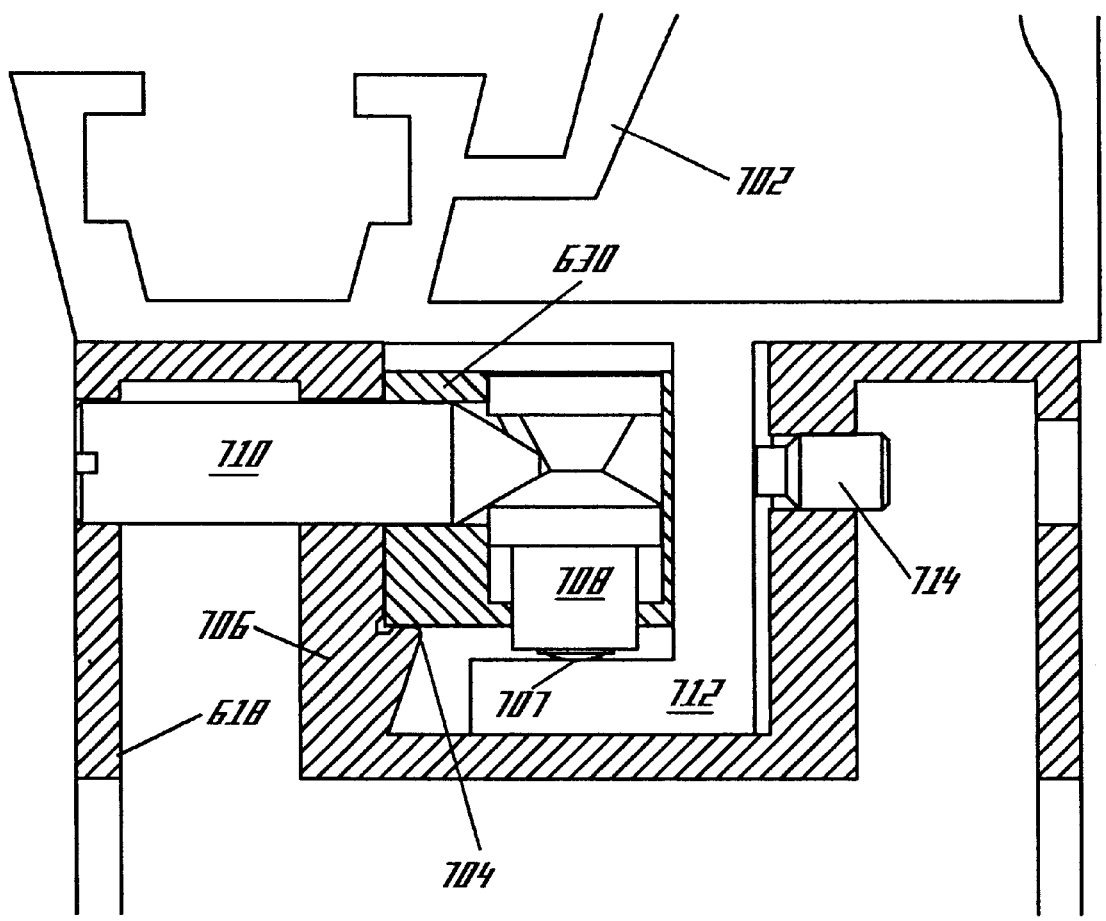
FIG. 7 is a cross-sectional end elevation view illustrating locking components of the upper and lower fences shown in FIGS. 1 and 2.

As may be appreciated by reference to FIG. 7, a cross section taken through the lower fence 618 and a portion of the upper fence 702, lower fence 618 has a longitudinal recess or trough 628 (also identified in FIG. 6). Trough 628 has a small ledge 704 protruding from one trough 628 wall 706. Link block 630 is an elongated bar having (in the illustrated embodiment) a rectangular cross-sectional shape. Link block 630 rests on ledge 704 and is attached to the lower fence 618 with cap screws 632 that are inserted from the front of lower fence 618 (see FIG. 6). The purpose of link block 630 is twofold. First, it prevents the upper fence 702 from rotating about a vertical axis. Second, it holds the link foot 708 and link screw 710.

The link foot 708 and link screw 710, are used to control the sliding fit between the J-hook 712 of upper fence 702 and lower fence 618. Driving in link screw 710 (clockwise with a right-hand thread) forces down link foot 708, which is a turned brass part containing a cutout, the profile of which matches the profile of the link screw. A narrow portion of the link foot 708 passes through a hole in the link block 630. A button 707 of nylon or other appropriately low friction material is pressed into a hole in the lower end of the link foot 708 to provide a low friction bearing surface against the J-hook 712 in the narrower portion of the block. When the link screw is driven in, this button is pressed down against J-hook 712, and the sliding resistance between upper fence 702 and lower fence 618 is increased and the play is reduced. By retracting the link screw 710 (counter-clockwise with a right-hand thread) the pressure exerted on J-hook 712 by link foot 708 is reduced, the play is increased and the resistance is reduced. Link screw 710 should be adjusted such that there is almost no resistance but also minimal play. On the back of the lower fence 618 a nylon tipped setscrew 714 is used to apply pressure on the upper fence 702 by pressing J-hook 712 against the link block 630 of the lower fence 618.

The Upper Fence

Upper fence 702 (shown exploded in FIG. 8) serves as a workpiece holder and couples the workpiece 902 with the shape-controlling components of the machine. While upper fence 702 is denominated a "fence" because of its shape in the embodiment illustrated in the drawings, it could have an entirely different configuration and still serve its function as a workpiece holder. The only practical limitation on the width of joints that can be formed on the joint-making machine of this invention is the capacity of the upper fence 702 to hold a workpiece. In the form of upper fence illustrated as 702 in the drawings, the width of the upper fence limits the width of joint possible, but other workpiece holders could accommodate wider joints.

Figure 8:
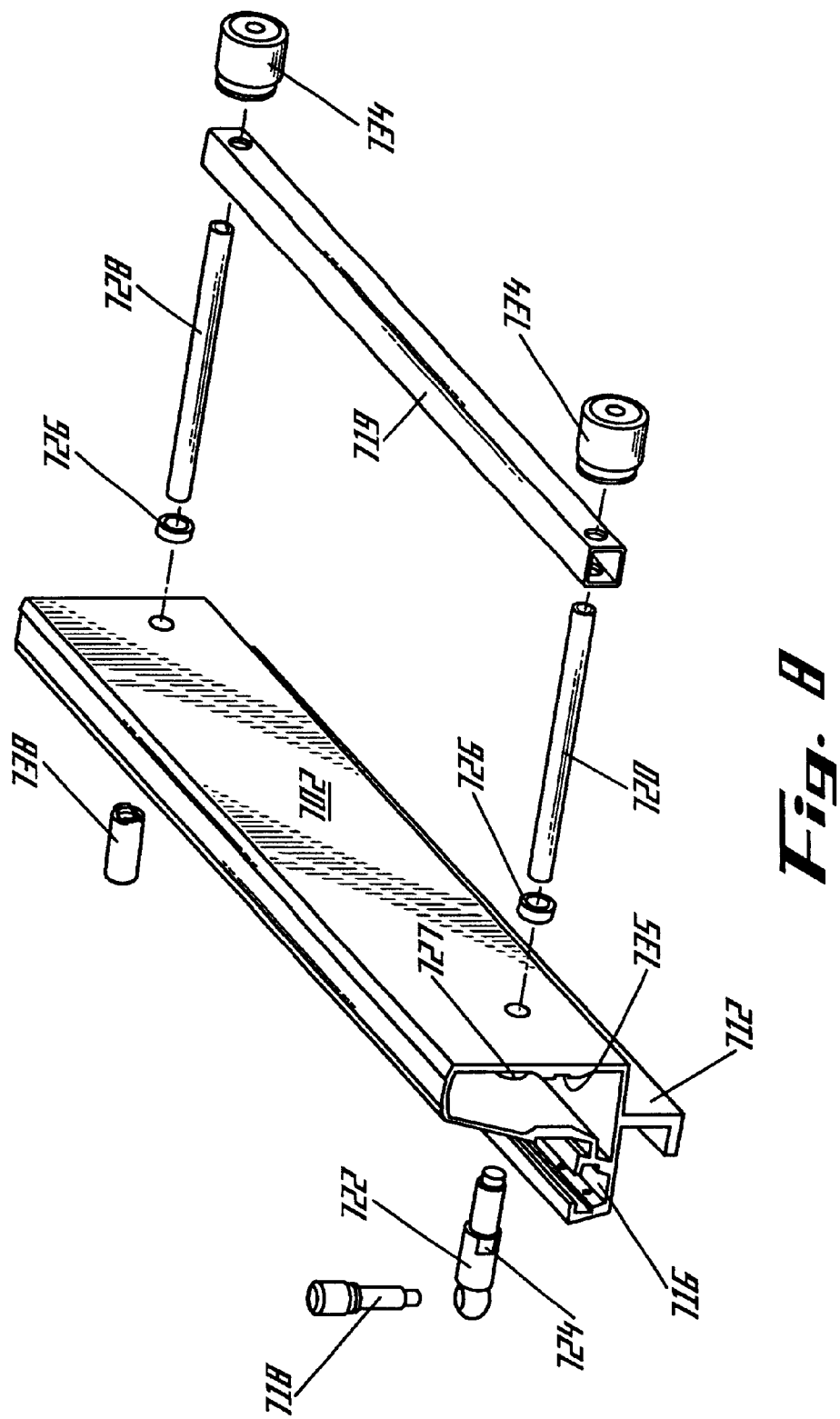
FIG. 8 is an exploded perspective view of the upper fence assembly shown in FIGS. 1 and 2.

FIG. 8 illustrates the major components of the upper fence 702. As noted above, the upper fence 702, which may be conveniently fabricated as an aluminum extrusion, has a J-hook channel 712 protruding from its underside that connects upper fence 702 to lower fence 618.

Front 714 of upper fence 702 has a slot 716 that accepts either the spacer tray 402 or a user-made spacing stick 406. The spacer tray 402 is held in position using the spacer tray lock 718.

In order to keep the spacer tray 402 aligned with the actual workpiece 902, the spacer tray lock 718 is connected directly to the right clamp bar 719 shaft 720 via the spacer tray arm 722. The arm 722 is held vertical by two flats 724 on either side of arm 722 that engage in a rectangular hole 727 in the upper fence 702.

Internally threaded clamp rings 726 secure the threaded clamp bar shafts 720 and 728 to the upper fence 702. Clamp rings 726 also serve to position the workpiece 902 laterally relative to upper fence 702. By sizing the diameter of the end spacers 410 the same as the diameter of the clamp rings 726, alignment of the workpiece 902 and spacer tray 402 are automatic. This is illustrated in FIG. 9.

Figure 10:
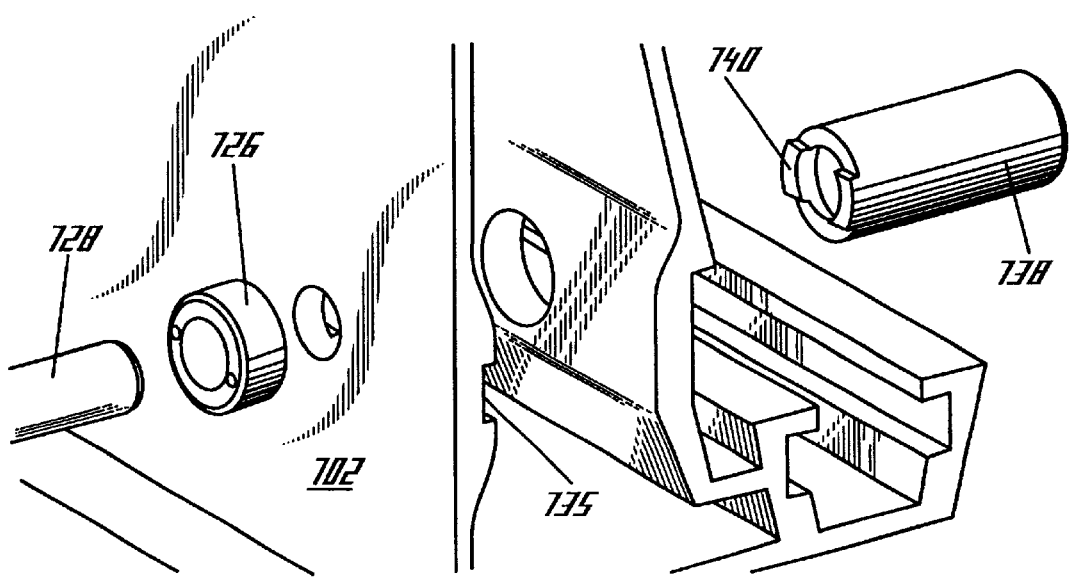
FIG. 10 is a perspective view of the of the opposite end of the fence shown in FIG. 9 illustrating the clamp shaft nut and the trough in the upper fence in which it seats.

The spacer tray lock arm 722 and a clamp ring 726 secure the right clamp shaft 720. As is shown in FIG. 10, the left clamp shaft 728 is held in place by the clamp shaft nut 738 and a second clamp ring 726. To prevent the nut 738 from turning when the clamp ring 726 disc is tightened, two protrusions 740 from the nut 738 engage in a small trough 735 in the upper fence 702.

Figure 9:
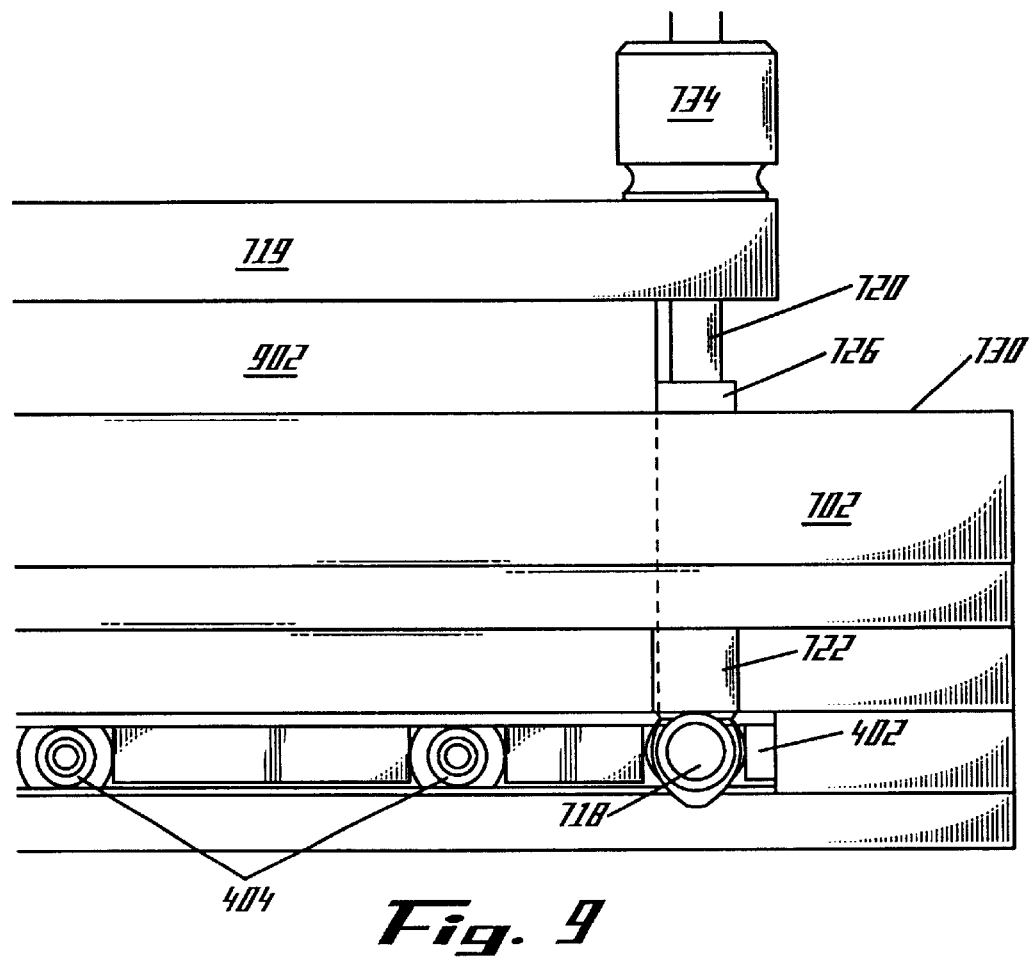
FIG. 9 is a top plan view of one end of the upper fence shown in FIG. 1 with a spacer tray located in the fence and the fence lock engaging the end spacer.

As is illustrated in FIG. 9, the workpiece 902 is placed between the vertical face 730 of the upper fence 702 and the clamp bar 719. Workpiece 902 is slid to the right until it contacts the clamp ring 726 opposite the spacer tray lock 718. Clamp bar 719 slides along the two clamp shafts 720 and 728, and is tightened against workpiece 902 using the two clamp knobs 734.

The Center Guide Assembly

Figure 11:
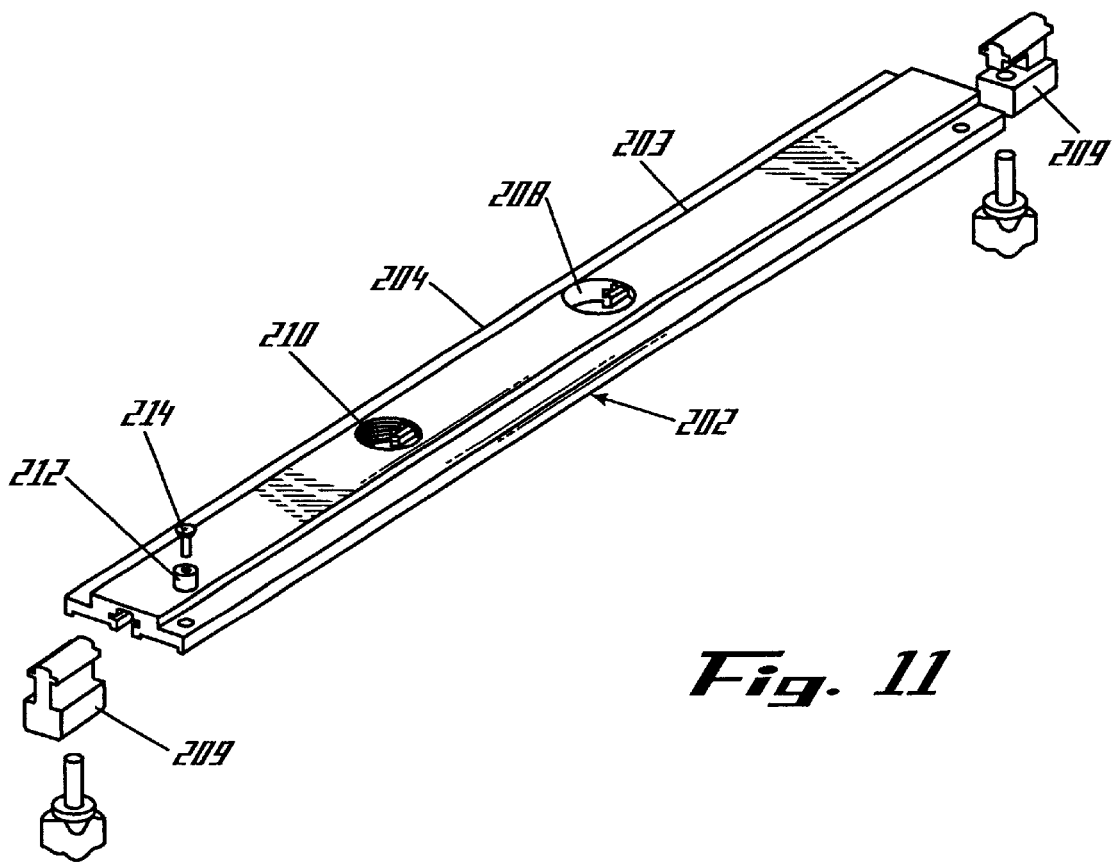
FIG. 11 is an enlarged perspective view of the center guide assembly shown in FIGS. 1 and 2.
Figure 12:
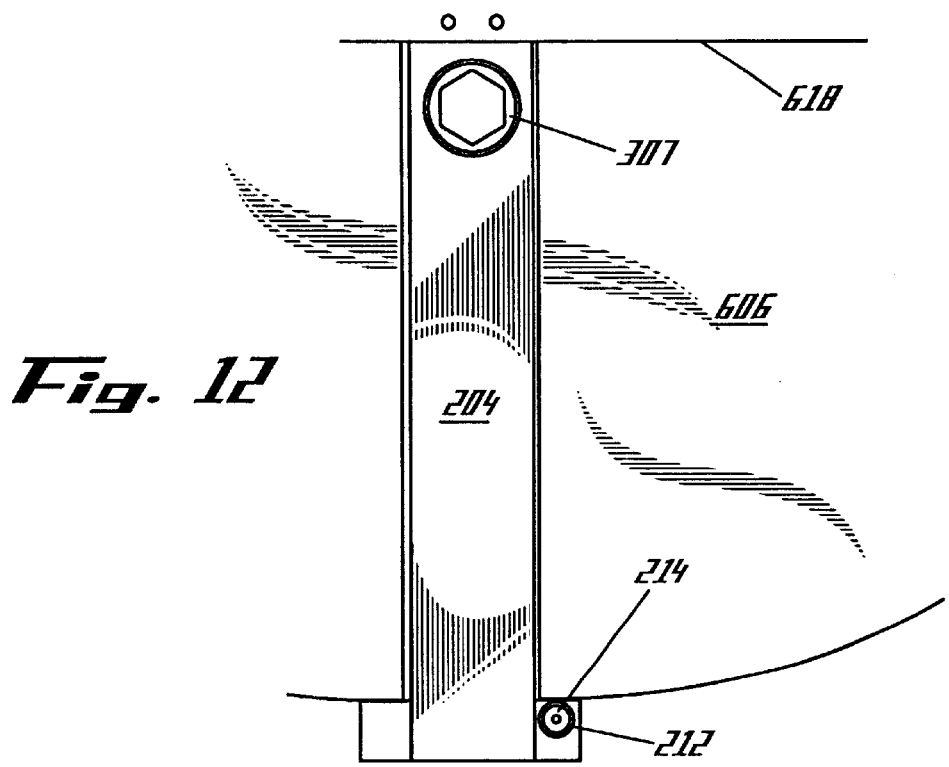
FIG. 12 is a top plan view of a portion of the lower fence and a portion of the center guide assembly illustrating the function of a stop on the proximate end of the center guide assembly.

The center guide assembly 202 illustrated in FIG. 11 is the interface between the rest of the components of this invention and the router table with which it is used. The center guide assembly 202 utilizes a center guide 204 having a longitudinal tee-slot 206 on the underside of the guide 204. This slot 206 accepts a pair of mini c-clamps 209 that are used to attach the guide to a thin router table like the table disclosed in U.S. Pat. No. 5,715,880 or other similar tables. Alternative fastening arrangements can be made for securing the center guide assembly 202 to other router tables.

Guide 204 has one relatively large hole 208 within which the router bit (744 in FIG. 18) is positioned. This router bit hole 208 is centered relative to the collet of the router (not shown) as part of the setup procedure.

A second, threaded hole 210 in guide 204 holds the pin jack 307 that is used with the templates such as template 304 when forming pins. A rubber stop 212 is secured with a screw 214 on the top at the front of guide 204 so that when the lower fence 618 is pulled back (typically toward the user) during the cutting process, it is stopped by contact between wing 606 and stop 212 before lower fence 618 contacts the pin jack 307.

The Pin Jack

Figure 13:
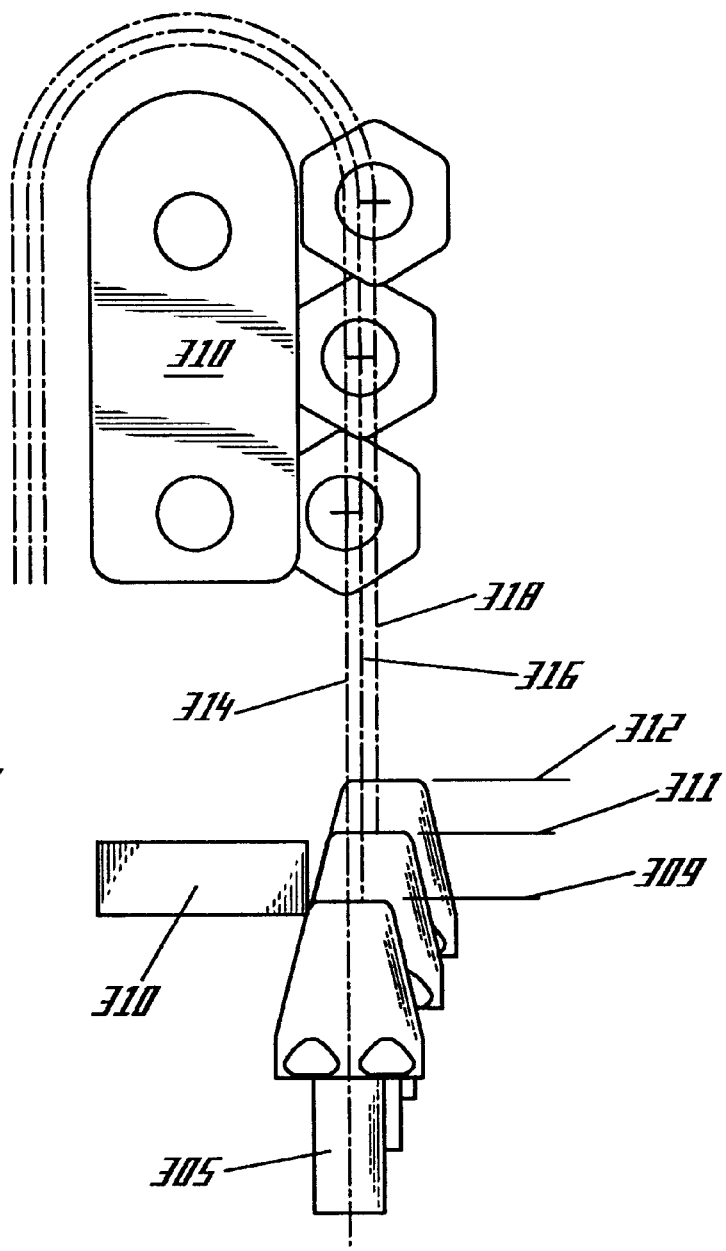
FIG. 13 illustrates the effect of adjusting the height of the tapered tracer pins of this invention.

The pin jack 307 is used to support the tapered pins 305 that trace around the templates. The pin jack 307 can be used with different diameters of tapered pins 305. Additionally, each pin 305 has an incremental range of diameters that can contact the template 310 made available by adjusting the height of the pin 305, as is illustrated in FIG. 13. FIG. 13 illustrates that at three different heights 309, 311 and 312, the portion of pin 305 contacting the template 310 has a slightly different diameter, thus causing travel around template 310 along different paths 314, 316 and 318, changing the size of the dovetail pin cut and thereby controlling the fit. Such adjustability can also be used to produce joint members having a desired amount of clearance between members so that inlays or the like can be inserted between joint members. If the tapered pin 305 has a 14° taper, that is equivalent to a ratio of 1 to 4. Therefore, by raising such a tapered pin 305 four units of distance, the center of the pin 305 moves away from the template 310 one unit of distance. Since this happens on both sides of the template, the width of the pin is increased two units. This is illustrated in FIG. 13.

Figure 14:
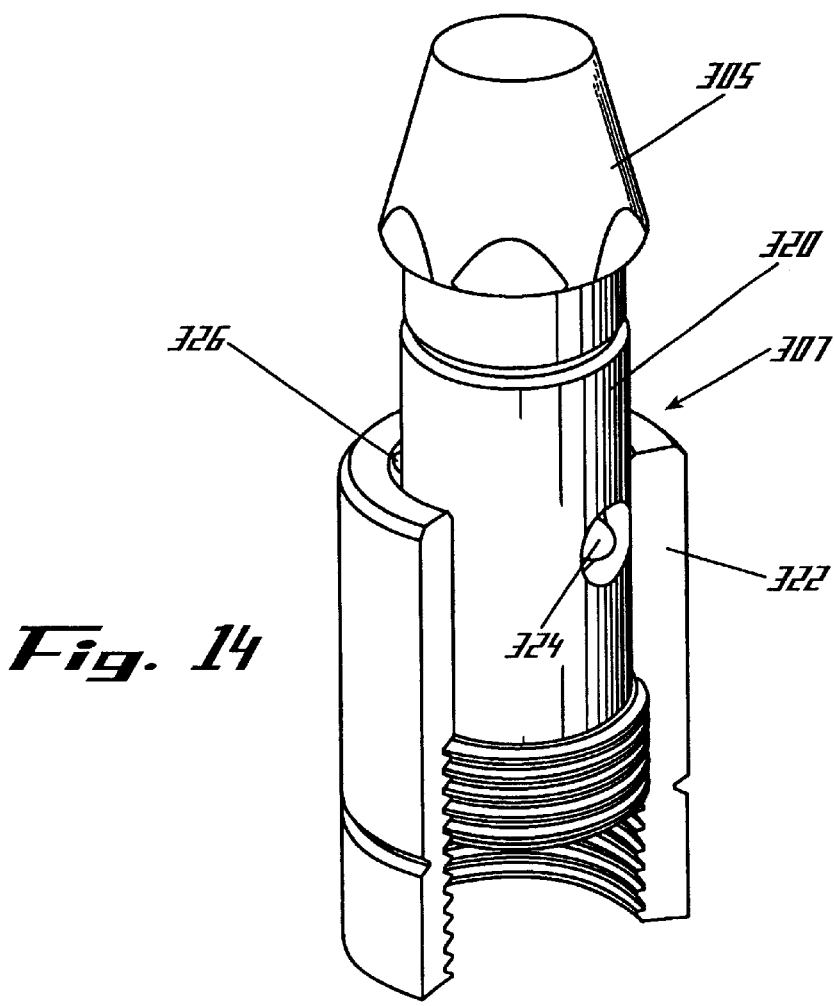
FIG. 14 is a perspective view of the pin jack shown in FIGS. 1 and 2 with part of the pin jack body broken away.

As is illustrated in FIG. 14, the pin 305 is positioned in a pin jack dial 320 that is threaded into, and positionable in, a pin jack base 322 to accurately control the height of the tapered pins 305. The pin jack dial 320 is externally threaded and carries a spring loaded positioner 324 such as a bullet catch that is received in a series of flutes 326 (e.g., eight flutes) on the inside of pin jack body 322 to provide a detent arrangement so that pin jack dial 320 will be retained at a selected one of several rotational positions. By rotating the pin jack dial 320, the positioner 324 sequentially engages in each flute 326, temporarily locking the dial 320 in that orientation and preventing unintentional rotation. As the pin jack dial 320 is threaded into the pin jack body 322, each time the positioner 324 engages, the tapered pin 305 moves slightly up or down depending on which way the pin jack dial 320 is turned. External threads (not shown) on pin jack body 322 secure body 322 within threaded hole 210 in center guide 204.

If the thread used on the pin jack dial 320 and inside pin jack body 322 has 16 threads per inch, for each full revolution the pin jack dial 320 will be raised by 0.0625". With eight flutes 326 in the pin jack base 322, each time the detent engages the height will be changed by 0.0078". With a 14° angle on the tapered pin 305 this means that for each click of the detent, the width of the joint pin cut is increased or decreased by 0.004".

The Spacer Tray

Figure 15:
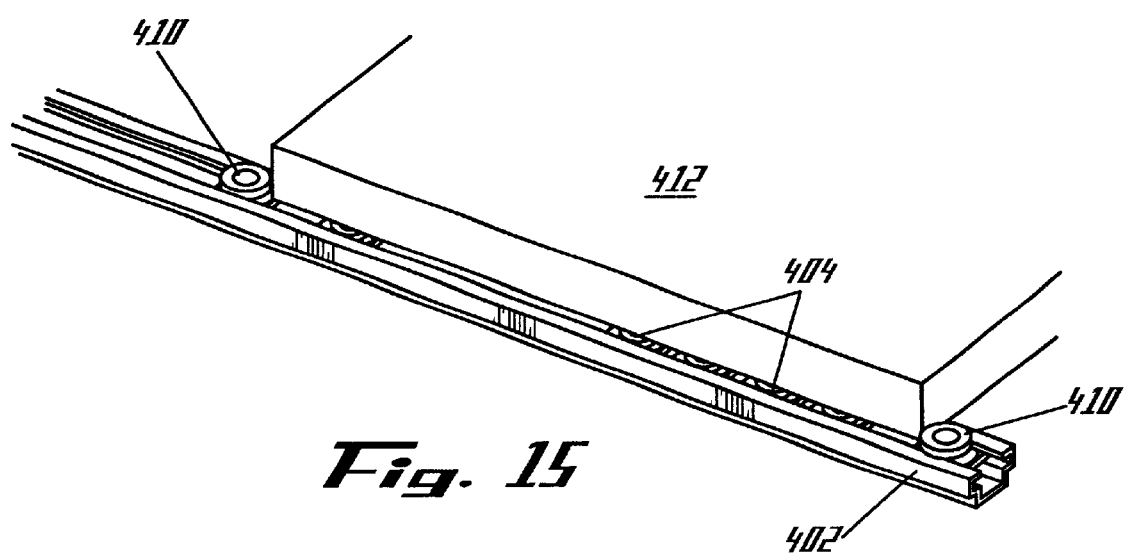
FIG. 15 illustrates setting up the spacer tray.
Figure 16:
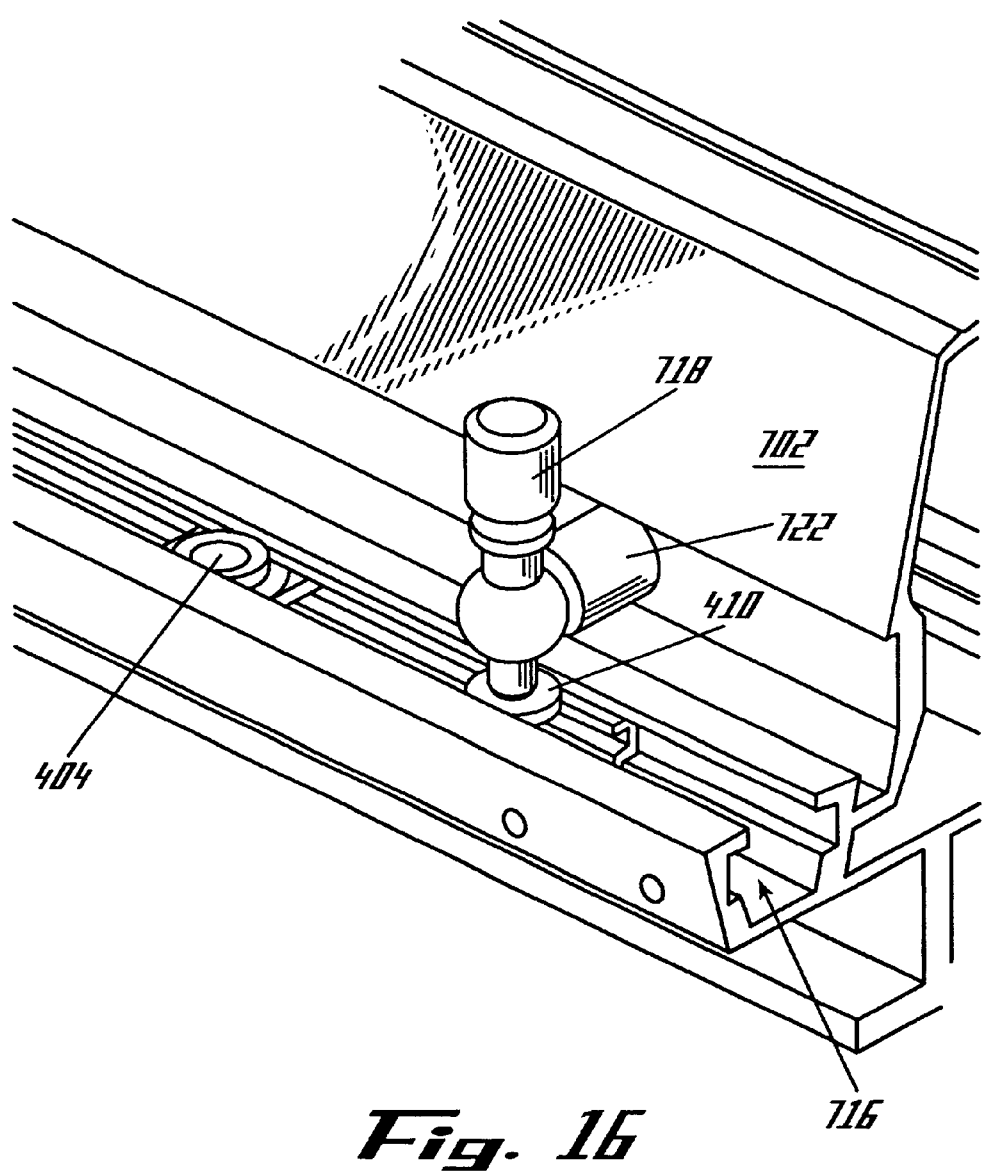
FIG. 16 shows locking the spacer tray in the upper fence.

The spacer tray 402 shown in FIG. 4 is used to set the spacing of the pins and tails. The end spacers 410 are used to set the width of the material being worked; the intermediate spacers 404 are used to set the centers of the pins and tails. This procedure is explained below and illustrated in FIG. 15.

1. To set the spacer tray 402 begin by locking one of the end spacers 410 in the spacer tray 402 using an appropriate tool such as a hex key to adjust the set screw (not shown) to lock the end spacer 410 in position.
2. Decide upon the number of pins or tails in the joint. Slide that number of regular spacers 404 into the spacer tray 402. There is no need to lock them yet.

3. Slide a second end spacer 410 into the spacer tray 404.
4. Position a workpiece board 412 on the tray 402 against the locked end spacer 410 and slide the other end spacer 410 against the opposite edge of the board 412. Lock the second end spacer 410.
5. Remove the board 412 and set the positions of the pins and tails using the regular spacers 404. Lock these spacers 404 as well. Extra spacers 404 may be stored in the unused portion of the spacer tray 402.

Figure 17:
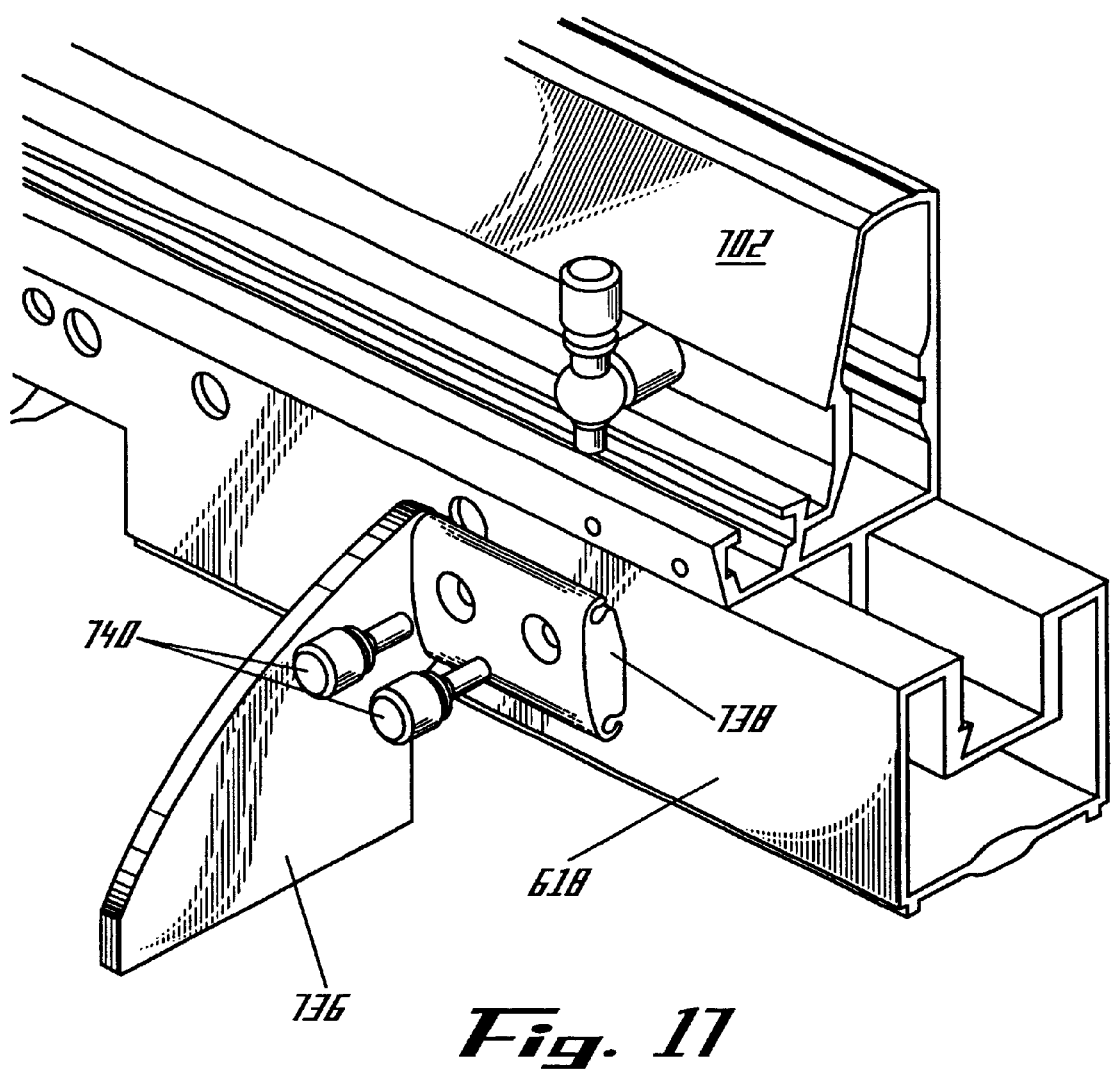
FIG. 17 is an exploded perspective view of the auxiliary fence components and their relationship to the upper and lower fences.

The spacer tray 402 slides into the mating slot 716 in the upper fence 702. It is held in place by screwing the spacer tray knob 718 into either of the end spacers 410 as illustrated in FIG. 17.

In order to cut symmetrical dovetails or other joint elements, one joint must be cut with the spacer tray 402 inserted one way, and the opposing joint is cut with the spacer tray 402 inserted in the opposing way. To flip the spacer tray 402, the spacer tray lock 718 is disengaged, the tray 402 is, slide out, turned around, and reinserted in the upper fence. Then they tray 402 is locked using the other end spacer.

The Control Block

The control block or controller 502 illustrated in FIG. 5 controls the type of cut begin made, the shape, the fit, and the spacing.

Figure 20:
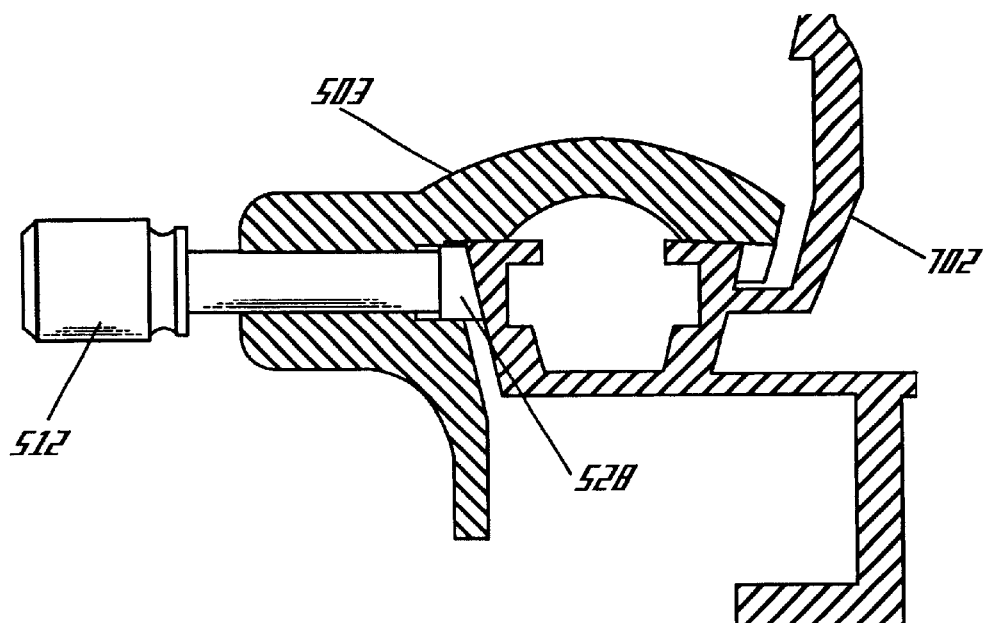
FIG. 20 is a cross-sectional view of the control block and a portion of the upper fence show the manner in which the control block locks to the upper fence.

When using the control block 502 in conjunction with the templates, it is very important that the template be held in the same position each time that it is used. It is for this reason that the control block 502 has a lock 512 that may be understood by reference to FIG. 20. Once the control block 502 has been moved into position and the indexing pin or screw 504 has been engaged in a spacer, the control block is locked to the upper fence 702 using the control lock 512. As is illustrated in FIG. 20, control lock 512 is a screw threaded (threads are not shown in drawing) into control body 503 to bear against control foot 528, which in turn locks control body 503 to upper fence 702.

When tailboards are being cut, the controller 502 must be locked to the lower fence 618. This is accomplished using the lower fence lock screws 514, as illustrated in FIG. 5. The templates are affixed to the control body 503 via the template arm 506. The template arm 506 is secured to the control body 503 using the template arm lock knob 516, which has a tapered point that is driven into a mating tapered hole in the template arm 506. The template arm is inserted in the slot 518 in the control block such that it mates with the back surface of the slot 518 in control body 503. The holes for the arm lock 516 are positioned so that driving in the lock 516 pushes the template arm 506 both inward and down.

The template arm 506 has a window 520 in the center that allows for greater visibility of the templates. The template arm 506 also has six counterbored and threaded holes 522 into which cap screws 524 securing the templates are affixed. Each template may be secured to the template arm 506 using a pair of template standoffs 526. The standoffs 526 preferably have cylindrical protrusions on each end that insert into counterbores in the template arm 506 and into matching holes in the templates. Other template securing arrangements are, of course, possible.

The Template System

Depending upon the type of joint being cut, the style of cutter used, and the material thickness, a different template required for each different joint. Templates are used only for the pin boards; the tail boards are cut using the shape of the cutter. The type of joint is the first consideration that differentiates the templates. Numerous sizes and shapes of templates are possible. Generally templates for forming through dovetails will have a portion with parallel sides joined to a tapered portion. Templates for half blind dovetails will have parallel sides and a half-round end. Templates for finger joints or box joints will have parallel sides. As noted above, templates need not be one-piece structures but can have two or more components to enable adjustment of the width or other attributes of the joint element made with the template.

Auxiliary Fence

In certain cases it is necessary to make cuts with the workpiece laid horizontally. Such cuts are necessary for example when half-blind tailboards are being made. FIG. 21 illustrates a half-blind tailboard 106. In these circumstances it is necessary to use the auxiliary fence 736. The auxiliary fence 736 is attached directly to the upper fence 702 at the location shown in FIGS. 1, 17 and 18, by attaching an auxiliary fence support 738 to fence 702 with two screws 740. Auxiliary fence 736 is attached to one end of support 738.

Figure 18:
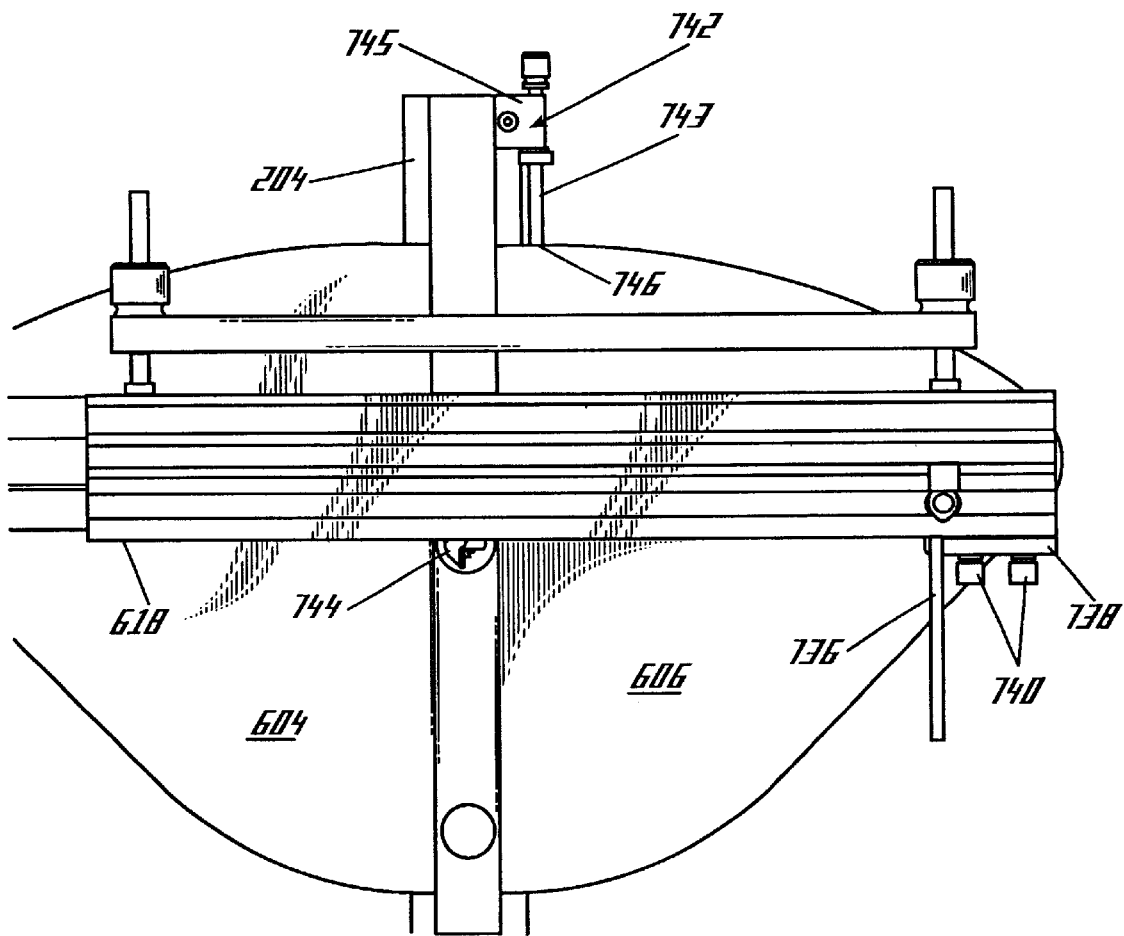
FIG. 18 is a top plan view of the upper and lower fences positioned on the center guide, with the auxiliary fence mounted and the adjustable depth stop shown mounted on the center guide.

The auxiliary fence 736 is used in conjunction with the depth stop 742 that mounts to the center guide 204, as illustrated in FIG. 18. The depth stop 742 controls how far the bit 744 projects in front of the lower fence 618 when the fence 618 and other components are pushed as far along center guide assembly 202 as possible. Depth stop 742 functions by contact between depth stop bumper 746 at then end of stop shank 743 and wing 606, as illustrated in FIG. 18. Adjustability may be achieved by rotation of a threaded stop shank or screw 743 within a threaded hole in stop body 745 or by other conventional structures providing an adjustable stop.

When making joints that require this type of stopped cut, the workpiece is laid flat on wings 604 and 606 with the workpiece end abutting the lower fence 618 and the workpiece edge forced against the auxiliary fence 736. Each cut is positioned using the controller 502 and the spacer tray 402. Each cut is made by pushing the workpiece into the bit 744 as the wings 604 and 606 and fence 618 slide upward in FIG. 18, causing the bit 744 to enter the workpiece the distance permitted by adjustable stop 742.

Summary of Operation

Cutting of joint components begins with the setting the spacers that determine where the centers of both the pins and tails will be located. The tailboard is clamped to the upper fence, and a bit appropriate in shape for the joint being cut is secured in the router collet. Using the spacer engagement pin or screw, straight cuts are made through the tailboard centered on each spacer.

The tailboard is then removed and the pin board is clamped to the upper fence. A straight bit is secured in the router collet or chuck, and the pin jack is positioned in the center guide. An appropriate template that corresponds to the shape of the bit used for the tailboard is then fastened to the control block using the template lock. Using the spacer engagement pin to successively locate the upper fence relative to the lower fence, the pins are cut out of the end of the pinboard by moving the template and workpiece around the pin jack.

Fine adjustment of the width of the pins may be accomplished by adjusting the height of the tapered, height adjustable pin using the pin jack. Raising or lowering the height of the tracer pin can vary the width of the pins on the pin board by very small increments.

Possible Modifications

As will be understood by those skilled in the art, the principles of this invention can be practiced in a number of alternative structures both similar and dissimilar in appearance and construction to the exemplary embodiment of this invention shown in the drawings and described above. For instance, while anodized aluminum extrusions are excellent materials for several of the guide, fence and control block or body components of this invention, other materials, including machined metals and plastic or plastic composite materials could also be used.

Wings 604 and 606 may be made of solid steel, aluminum or other metals and could be solid plastic, plywood or other materials, including composite sheet material having a thermoplastic core bonded between two aluminum skins (e.g., 0.020 inch gauge aluminum sheets) and sold under the name AlucoBond®, available from Alusuisse Composites, Inc., 55 West Port Plaza, Ste. 625, St. Louis, Mo. 63146.

Alternative components could also be used. For instance different clamping arrangements can be used for securing workpieces to the upper fence or for securing the center guide to the router table being used. Spring loaded pins could be substituted for some of the locking screws, and other alternative fasteners could also be used. Cylindrical tracer pins could be used rather than the tapered ones shown and described with sacrifice of only the ability to change the effective diameter of the tracer pin by adjusting its height. The ability to adjust joint element size can be achieved by mounting the templates in a manner that permits them to slide back and forth along the template arm. Templates can also be made with adjustable widths by, for instance, making each template from two or more pieces rather than from a single piece. This permits the user to form workpiece pins of variable width by adjusting the template pieces to have a width corresponding to the desired pin width.

The lower fence could also be significantly different in shape so long as it provides transverse movement of the workpiece and accommodates lateral movement of the workpiece relative to itself.

Different configurations of spacers are possible. For instance, spacers could be mounted directly in or on the upper fence rather than in a tray that is in turn mounted in the upper fence. Engagement between the control block also does not need to be a pin-in-hole arrangement but could be any of numerous engagement or locking arrangements such as a foot or tangent-in-slot arrangement. Indeed spacers could be entirely dispensed with provided that alternative provision is made for locating the places that the workpiece is to be machined. For instance, the workpiece can be marked directly, or the control block or its functional equivalent could be positioned before locking to the upper fence by reference to measuring marks (on a scale or rule) or by reference to stop components other than holes, such as slots, screws, protrusions, edges or spacers or the like.

Relocation of components is also possible. For instance, while location of the pattern and tracer pin in the same lateral location as the router cutter facilitates visualization by the operator of cutter action, the pattern and tracer pin could also be located in other locations relative to the router cutter, such as offset to the side or inverted. It is simply necessary for the relative location of the pattern and the portion of a workpiece mounted in the machine being cut to be the same as the relative locations of the pin and the router cutter.

Additionally, it is possible to swap the relative locations of the tracer pin and the pattern. While the locations shown in the drawings provide good logical mapping, it is possible to fix the pattern in the center guide or elsewhere so that its position is fixed relative to the router cutter and mount the tracer pin on the control block so that the tracer pin traces around the pattern.

With appropriate modifications, the entire apparatus could also be, in effect, inverted 180 degrees or rotated ninety degrees—i.e., the router cutter could protrude down from the router with the end of the workpiece being machined facing up, or the router cutter could be positioned to rotate about a horizontal axis. A dedicated machine 101 of the invention could also be fabricated without a router table top and with appropriate substitute support for the machine 101 components.

In another possible relocation, the center guide need not be in the center of the router table aligned with the router bit. One or more guides could be offset from the router bit; the important requirement is simply that there be structure that permits linear motion across the router table top or its functional equivalent so that the cutter can enter and exit the workpiece along a straight line (when tails are being cut).

All of these possible modifications, as well as others that will be recognized as possible by those skilled in the art, are intended to be included within the scope and spirit of the drawings and description above and the following claims.

What is claimed is:

1. An apparatus for use with a router to cut woodworking joints, comprising:
   (a) an elongated center guide for positioning relative to the router,
   (b) a lower fence for sliding along the center guide while positioned transverse to the direction of such sliding motion,
   (c) an upper fence for sliding or fixed attachment to the lower fence,
   (d) a clamp for securing a workpiece-to the upper fence,
   (e) a spacer tray for holding spacers and for attachment to one of the upper fence or the lower fence,
   (f) a control block for selectively fixing the position of the upper fence relative to the lower fence by reference to the spacers.

2. The apparatus of claim 1, further comprising a tracer pin for fixed positioning relative to the router, and at least one template for alternative positioning relative to the upper fence for controlling movement of the upper fence relative to the router by moving the upper fence while maintaining contact between the template and the tracer pin.

3. The apparatus of claim 1, wherein the tracer pin has a template contact surface, the contact surface is conical, and a pin jack for adjusting the height of the tracer pin relative to the template so that different portions of the conical contact surface can be made to contact the tracer.

4. The apparatus of claim 1, wherein the spacer tray comprises an elongated channel within which multiple spacers, each containing at least one index pin hole, may be locked.

5. The apparatus of claim 1 wherein the spacer tray comprises structure having a plurality of locator holes.

6. The apparatus of claim 1, wherein the spacer tray may be locked within the upper fence.

7. The apparatus of claim 1, further comprising an indexing pin attached to the control block for contact with selected spacers.

8. The apparatus of claim 1, further comprising a locking pin for engagement between the control block and the upper fence to selectively secure the control block to the upper fence.

9. The apparatus of claim 1, further comprising a lock for selectively securing the control block to the upper fence.

10. The apparatus of claim 1, further comprising an auxiliary fence attachable to project at a right angle to the upper fence.

11. The apparatus of claim 1, further comprising a stop secured to the center guide to limit travel of the lower fence.

12. The apparatus of claim 1, further comprising an adjustable stop secured to the center guide to limit travel of the lower fence.

13. A method for cutting workpieces using a router and router cutter in order to form a woodworking joint joining the workpieces, comprising:

(a) securing an elongated guide relative to the router, (b) securing a first workpiece to a first component, (c) positioning the first component laterally relative to the guide by reference to a first spacer, (d) sliding the first component and workpiece along the guide to engage the router cutter at a first position on the workpiece, (e) repositioning the first component laterally relative to the guide by reference to a second spacer, and (f) sliding the first component and workpiece along the guide to engage the router cutter at a second location on the workpiece.

14. The method of claim 13, further comprising:

(a) securing a tracing pin in a fixed position relative to the router, (b) securing a template to the first component by reference to one of the spacers, (c) securing a second workpiece to the first component and moving the first component and workpiece to engage the router cutter while maintaining contact between the tracing pin and the template, and (d) repositioning the template relative to the first component by reference to another of the spacers and moving the first component and workpiece to engage the router cutter while maintaining contact between the tracing pin and the template.

* * * * *